United States Patent
Borger

[15] 3,670,445
[45] June 20, 1972

[54] FISH HOOK GUARD

[72] Inventor: George Frederick Borger, 308 W. 49th St., New York, N.Y. 10019

[22] Filed: Feb. 5, 1971

[21] Appl. No.: 112,939

[52] U.S. Cl. .............................................43/42.4, 43/57.5 R
[51] Int. Cl. .........................................................A01k 97/06
[58] Field of Search ..................43/42.4, 57.5 R, 57.5 A, 25.2

[56] References Cited

UNITED STATES PATENTS 2,826,856  3/1958  Marion et al. .........................43/57.5 R
3,292,298  12/1966  Mullikin ...............................43/25.2 X

OTHER PUBLICATIONS

The Sporting Goods Dealer, July 1964, pg. 208
Popular Mechanics, April 1960, pg. 180

Primary Examiner—Samuel Koren
Assistant Examiner—George M. Yahwak
Attorney—Robert E. Burns and Emmanuel J. Lobato

[57] ABSTRACT

A guard for a barbed fish hook comprises a length of clear vinyl tubing having an internal diameter slightly less than the maximum cross sectional dimension of the hook at the point of the barb. The ends of the tubing are cut off at an angle of about 35° and slits are provided in opposite sides of the end portion midway between the high and low parts of the inclined end surface.

8 Claims, 5 Drawing Figures

PATENTED JUN 20 1972  3,670,445

FISH HOOK GUARD

The present invention relates to safety guards for barbed fish hooks.

Fish hooks present a constant hazard not only to fishermen but also to children and other persons since they are frequently left around the house or camp. Fish hooks are extremely sharp and can easily penetrate the fingers or other parts of the body causing a painful wound. If they penetrate beyond the barb portion of the hook they cannot be removed without painful extraction or surgery. Since they are frequently used and stored in many different conditions they are likely to be contaminated by germs that cause infection in any wound produced by the hook.

Apart from personal hazards, fish hooks may get caught in clothing or furniture, or car upholstery and may cause considerable damage in efforts to remove them.

It is an object of the present invention to provide a simple, inexpensive and yet highly effective fish hook guard which is easy to apply and easy to remove and, when in use, prevents injury and damage by the fish hook. It removes the danger of impalement by a fishing hook when the fishing rod is at rest on the boat or land, or is being transported from place to place. It also prevents entanglement while in the tackle box and damage to expensive lures. The guard also protects the hook by keeping it clean and thereby inhibiting rust or corrosion. Guards in accordance with the invention can be used on single hooks or on multiple hooks or lures. By reason of their small size, they do not appreciably increase the room required for storing and transporting fishing gear.

The nature, objects and advantages of the fish hook guards according to the present invention will appear more fully from the following description in conjunction with the accompanying drawings, which show by way of example a preferred construction in accordance with the invention.

IN THE DRAWINGS

Figure 1:
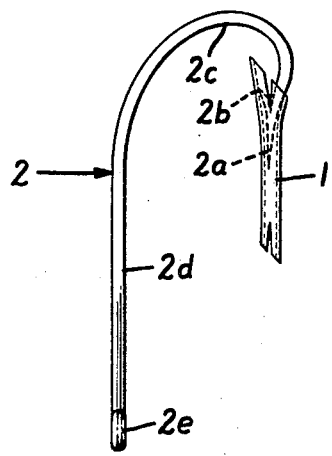
FIG. 1 shows a guard in accordance with the invention in place of a fish hook.
Figure 2:
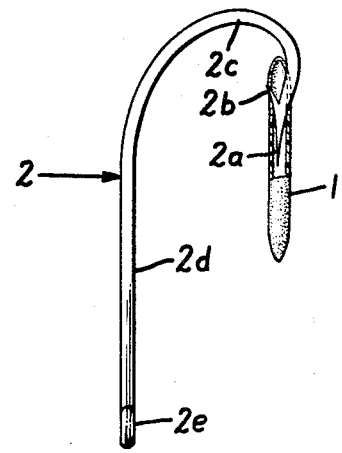
FIG. 2 illustrates how the guard is removed from the fish hook.

In FIG. 1 a guard 1, in accordance with the invention is shown in place of a fish hook 2 having a point 2a, a barb 2b, a curve 2c, a stem or shank 2d and an eye 2e.

Figure 3:
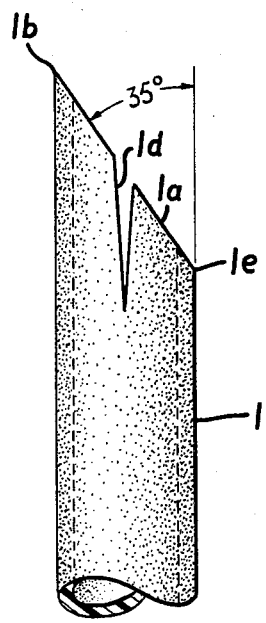
FIG. 3 is an enlarged side view of one end portion of the guard.
Figure 4:
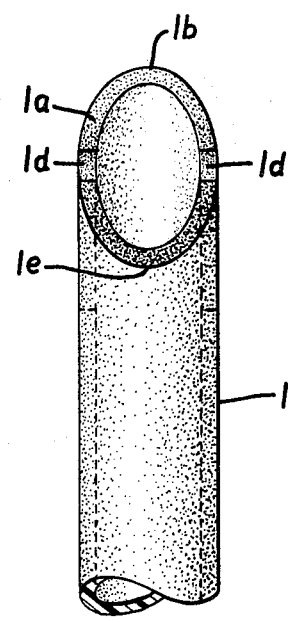
FIG. 4 is an enlarged front view of the portion of the guard shown in FIG. 3.
Figure 5:
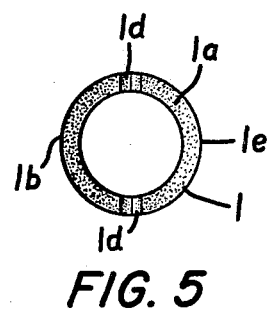
FIG. 5 is an enlarged end view.

The guard comprises a short piece of plastic tubing having at least one end and preferably both ends cut on a bias to form an inclined end face 1a as clearly seen in FIGS. 1 and 3. With tubing of circular cross-section as shown in FIG. 5, the resulting inclined end surface 1a is of elliptical shape, as seen in FIG. 4. For convenience of identification, the high part 1b of the elliptical end surface is herein referred to as the apogee, while the lowest part 1c is referred to as the perigee. In the sides of the end portion of the tube midway between the apogee and perigee of the end face there are small notches or slits 1d that extend inwardly past the perigee of the end face.

The tube is formed of plastic material which is firm, tough and semi-rigid yet sufficiently flexible and resilient that it can be bent and can be flattened slightly by pressure on opposite sides of the tube. By reason of its resilience, the tube resumes its original shape when the distorting force is removed. The inner surface of the tube is smooth and is sufficiently hard and dense that it cannot be readily penetrated by the barb of the hook. The outside of the tube may also be smooth or alternatively it may be slightly roughened or fluted to permit grasping it more easily. Preferably, the tube is transparent. The plastic material of which the tube is formed should be resistant to fresh and salt water, oil, grease or alcohol or other common solvents and should be resistant to aging by exposure to the air and sunlight. Its physical characteristics should remain substantially constant throughout a temperature range of 0° F to 100° F. While any plastic material having the indicated characteristics may be satisfactorily used, it is found that vinyl plastics, for example plastic known on "A.W.G. clear vinyl" is satisfactory.

The internal diameter of the tube forming the fish hook guard 1 is slightly smaller than the maximum cross-sectional dimension of the hook at the barb so that the tube can be slipped over the barb of the hook, as shown in FIG. 1, when the tube is flattened slightly to an oval cross-section by finger pressure on opposite sides of the tube.

The tube should, however, be large enough that the hook can be inserted into it, as seen in FIG. 1, by flexing the walls of the tube and without appreciable circumferential stretching. The side wall of the tube is sufficiently thick to provide a tube which has a firm feel and is not easily collapsed but can be slightly flattened by digital pressure on opposite sides of the tube. The wall thickness may, for example, be of the order of 0.16 inch to 0.25 inch. By way of example, the tube may have an outside diameter of 0.125 inch, an internal diameter of 0.075 inch and a wall thickness of 0.025 inch. Different sizes of tubing are used for hooks of different sizes. However, by reason of the resilience of the plastic material, a guard may be used satisfactorily on hooks of more than one size. The length of the tube is not critical but it should be long enough so that the guard can be handled easily. In practice, it has been found that a length of approximately one inch is satisfactory.

As seen in FIG. 3, the plane of the end face 1a forms an acute angle with the longitudinal axis of the tubing. It has been found that the angle of inclination of the end face should be between approximately 18° and 45° and preferably of the order of 35° to the longitudinal axis.

The notches 1d in the sides of the end portion of the tube are preferably formed by slitting the wall of the tube end without removal of material. The slit tends to open up to form a narrow V-shaped notch. The notches are of sufficient length of extend inwardly past the perigee 1c of the end face 1a, as seen in FIG. 3. Depending on the size of the guard and the size of the hook with which it is to be used, the notches may be from one-sixteenth inch to one-fourth inch in depth.

Guards in accordance with the present invention are easily and economically formed from suitable plastic tubing merely by cutting the tubing into suitable lengths with the cuts disposed at an angle to form the inclined end faces 1a as shown. The slits 1d are then formed in the ends of the tube lengths by a cutting or shearing operation.

A guard, in accordance with the invention, is applied to a fish hook by slipping it over the point of the hook, as shown in FIG. 1, with the high part of the inclined end on the barb side of the hook and hence toward the stem of the fish hook. By reason of the inside diameter of the tubing being slightly less than the cross-sectional dimension of the hook at the point of the barb, the tube must be slightly flattened or ovalized when it is pushed on the fish hook and is retained in place by the resilience of the tubing, which tends to return to its circular cross-sectional shape. As clearly seen in FIG. 1, the guard, when in place, protects both the point of the fish hook and the barb.

When it is desired to remove the guard from the fish hook, the guard is rotated a quarter turn in either direction so as to align one of the slits 1d with the barb of the hook. The barb is thereby released into the slit and the guard is readily removed.

As the guard is open at both ends there is no opportunity for dirt or other material to accumulate in it. The guard is thus easily kept clean. With the guard formed of transparent tubing it can be easily inspected and the position of the guard on the fish hook can be readily observed.

While a preferred embodiment of the invention has been illustrated by way of example in the drawings and is herein particularly described, it will be understood that the invention is in no way limited to the illustrated embodiments.

What I claim and desire to secure by letters patent is:

1. A guard for a barbed fish hook comprising a length of flexible resilient plastic tubing having an internal diameter slightly less than the largest cross-sectional dimension of said hook measured at the location of the barb, said length of tubing having at least one end inclined to the length of said tubing to form an inclined end surface having an apogee and a perigee, and a slit in at least one side wall of the tubing approximately midway between said apogee and perigee, said slit extending inwardly from said inclined end surface in a direction lengthwise of said tubing to a point inwardly of the perigee of said inclined end surface.

2. A fish hook guard according to claim 1, in which said inclined end surface is disposed at an angle of approximately 18° to 40° to the longitudinal axis of said tubing.

3. A fish hook guard according to claim 2, in which said inclined end surface is disposed at an angle of approximately 35° to the longitudinal axis of said tubing.

4. A fish hook guard according to claim 1, in which both end faces of said length of tubing are inclined and in which slits are provided at both ends in at least one side wall of the tubing.

5. A fish hook guard according to claim 1, in which a said slit is provided in each of opposite sides of the tubing.

6. A fish hook guard according to claim 1, in which the wall thickness of said tubing is of the order of 0.015 to 0.025 inches.

7. A fish hook guard according to claim 1, in which said tubing is transparent.

8. A fish hook guard according to claim 1, in which said tubing is formed of a vinyl plastic.

* * * * *